428-408
6/8/82
XR 4,333,813

United States Patent [19]
Kaplan et al.

[11] 4,333,813
[45] Jun. 8, 1982

[54] CATHODES FOR ALUMINA REDUCTION CELLS

[75] Inventors: Howard I. Kaplan, Florence, Ala.; Jerry H. Bryce, Lawrenceburg, Tenn.; Thomas J. Johnston, Rogersville, Ala.; Curtis J. McMinn, Florence, Ala.; John T. Willett, Florence, Ala.; Nolan E. Richards, Florence, Ala.

[73] Assignee: Reynolds Metals Company, Richmond, Va.

[21] Appl. No.: 203,559

[22] Filed: Nov. 5, 1980

Related U.S. Application Data

[63] Continuation-in-part of Ser. No. 126,837, Mar. 3, 1980, abandoned, which is a continuation of Ser. No. 43,241, May 29, 1979, abandoned, which is a continuation of Ser. No. 43,338, May 29, 1979, abandoned.

[51] Int. Cl.³ .......................... C25C 3/08; B32B 9/04; B05D 5/12
[52] U.S. Cl. ............................. 204/243 R; 204/294; 204/291; 428/367; 428/408; 428/688; 427/113; 428/697
[58] Field of Search ............... 204/243 R–247, 204/67, 291, 294; 428/539, 408, 367; 427/113

[56] References Cited

U.S. PATENT DOCUMENTS

| | | | |
|---|---|---|---|
| 2,636,856 | 4/1953 | Suggs et al. | 204/290 |
| 3,143,413 | 8/1964 | Krapf | 75/201 |
| 3,251,700 | 5/1966 | Mandorf, Jr. | 106/65 |
| 3,328,280 | 6/1967 | Richards et al. | 204/243 R |
| 3,340,077 | 9/1967 | Alper et al. | 106/56 |
| 3,400,061 | 9/1968 | Lewis et al. | 204/67 |
| 3,408,312 | 10/1968 | Richards et al. | 252/518 |
| 3,546,769 | 12/1970 | Schwope et al. | 29/420.5 |
| 3,661,736 | 5/1972 | Holliday | 204/67 |
| 3,729,794 | 5/1973 | Douglass | 29/182.1 |
| 3,736,159 | 5/1973 | Gibson et al. | 106/56 |
| 3,856,650 | 12/1974 | Kugler et al. | 204/290 R |
| 3,888,661 | 6/1975 | Levitt et al. | 75/201 |
| 3,937,619 | 2/1976 | Clougherty | 29/182.5 |
| 4,071,420 | 1/1978 | Foster, Jr. et al. | 204/67 |
| 4,083,719 | 4/1978 | Arakawa et al. | 75/229 |
| 4,093,524 | 6/1978 | Payne | 204/61 |
| 4,181,583 | 1/1980 | Steiger et al. | 204/67 |
| 4,219,391 | 8/1980 | Foster, Jr. | 204/67 |
| 4,224,128 | 9/1980 | Walton | 204/243 R |
| 4,231,853 | 11/1980 | Rahn | 204/243 R |
| 4,265,727 | 5/1981 | Beckley | 204/294 X |
| 4,285,796 | 8/1981 | Stoner et al. | 204/294 X |

FOREIGN PATENT DOCUMENTS

| | | |
|---|---|---|
| 784695 | 10/1957 | United Kingdom . |
| 802905 | 10/1958 | United Kingdom . |
| 826635 | 1/1960 | United Kingdom . |

OTHER PUBLICATIONS

G. Gerard, *Extractive Metallurgy of Aluminum*, vol. 2, "Aluminum", Interscience Publishers, 1963, pp. 461–483.

*Primary Examiner*—Delbert E. Gantz
*Assistant Examiner*—Donald R. Valentine
*Attorney, Agent, or Firm*—Lyne, Girard & McDonald

[57] ABSTRACT

This invention concerns cathodes for alumina reduction cells, particularly drained cathodes, which present a refractory surface for contacting molten aluminum on the cell floor. This invention also concerns materials for constructing such cathodes.

The cathodes described comprise a carbonaceous bed, preferably a graphite bed, and a composite tile. This tile is characterized by a layer of a refractory hard metal (RHM) material bonded to a base layer of a graphitic material, where the RHM layer comprises a hot pressed mixture of titanium diboride and aluminum nitride powders. The tile is further characterized by the bond between the RHM layer and the graphitic base layer, such bond having been produced simultaneously as the RHM layer is formed by hot pressing the mixture of titanium diboride and aluminum nitride powders directly against the graphitic base layer. The graphitic base layer is in turn bonded to the carbonaceous bed by means of a carbonaceous cement, and the RHM layer thereby provides a refractory surface for contacting molten aluminum.

29 Claims, 15 Drawing Figures

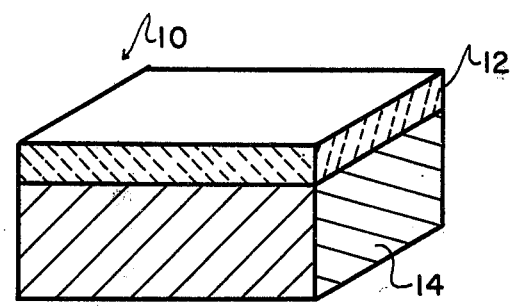
FIG. 1
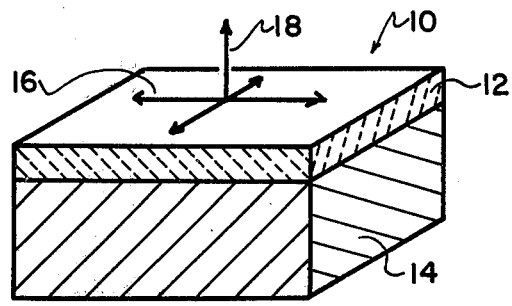
FIG. 2
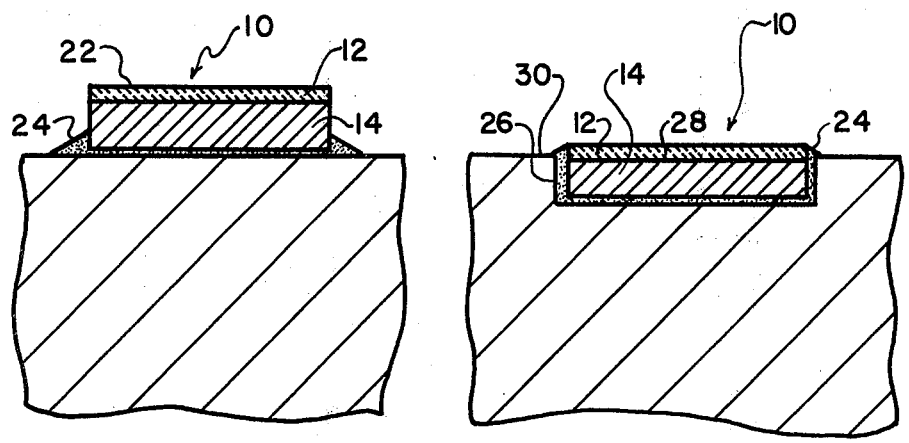
FIG. 3
FIG. 4

CATHODES FOR ALUMINA REDUCTION CELLS

CROSS-REFERENCE TO RELATED APPLICATIONS

This is a continuation-in-part of U.S. application Ser. No. 126,837, filed March 3, 1980, said U.S. application Ser. No. 126,837, now abandoned, being a continuation of U.S. application Ser. No. 43,241 filed May 29, 1979, now abandoned, and said U.S. application Ser. No. 126,837 being a continuation of U.S. application Ser. No. 43,338, filed May 29, 1979, now abandoned.

BACKGROUND OF THE INVENTION

This invention concerns cathodes, particularly drained cathodes for alumina reduction cells, which present a refractory surface for contacting molten aluminum on the cell floor. This invention also concerns materials for constructing such cathodes.

Presently, aluminum metal is conventionally produced by the electrolytic reduction of alumina dissolved in a molten cryolite bath according to the Hall-Heroult process.

This process for reducing alumina is carried out in a thermally insulated cell or "pot" which contains the alumina-cryolite solution. The cell floor, typically made of a carbonaceous material, provides some of the thermal insulation and serves as part of the cathode. The cell floor may be made up of a number of carbonaceous blocks bonded together with a carbonaceous cement, or it may be formed using a rammed mixture of finely ground carbonaceous material and pitch. The anode, which usually comprises one or more carbonaceous blocks, is suspended above the cell floor.

Resting on the cell floor, there is a layer or "pad" of molten aluminum which the bath sees as the true cathode. The anode, which projects down into the bath, is normally spaced from the pad at a distance of 1.50 to 3.00 inches (3.81 to 7.62 centimeters). The alumina cryolite bath is maintained on top of the pad at a depth of about 10.00 to 12.00 inches (25.40 to 30.48 centimeters).

As the bath is traversed by electric current, alumina is reduced to aluminum at the cathode, and carbon is oxidized to its dioxide at the anode. The aluminum thus produced is deposited on the pad and is tapped off periodically after it has accumulated.

For the electrolytic process to proceed efficiently, the alumina reduction should occur on to a cathode surface of aluminum and not the bare carbonaceous surface of the cell floor. Therefore, it is considered important for the pad to cover the cell floor completely.

As molten aluminum does not readily wet or spread thin on carbonaceous materials, the pad can best be visualized as a massive globule on the cell floor. In larger cells, the heavy currents of electrolysis give rise to powerful magnetic fields, sometimes causing the pad to be violently stirred and to be piled up in selected areas within the cell. Therefore, the pad must be thick enough so that its movements do not expose bare surface of the cell floor. At the same time, the anode must be sufficiently spaced from the pad to avoid short circuiting and to minimize reoxidation of aluminum.

Still, the movements of the pad have adverse effects which cannot be readily controlled. For a given cell operating with a particular current of electrolysis, there is an ideal working distance between the cathode and the anode for which the process will be most energy efficient. However, the required spacing of the anode due to the turbulence of the pad prevents this ideal working distance from being utilized. Further, since the pad is in a state of movement, a variable, uneven working distance is presented. This variable working distance can cause uneven wear or consumption of the anode. Pad turbulence can also cause an increase in back reaction or reoxidation at the anode of cathodic products, which lowers cell efficiency. In addition, pad turbulence tends to accelerate bottom liner distortion and degradation through thermal effects and through penetration by the cryolite and its constituents.

It has been suggested in the literature and prior patents that certain special materials, such as refractory hard metals (RHM), and most notably titanium diboride ($TiB_2$), can be used advantageously in forming the cell floor.

Ideally, in contrast to conventional carbon products, these materials are chemically compatible with the electrolytic bath at the high temperatures of cell operation. They are also compatible chemically with molten aluminum.

Also, with these special materials, the electrical resistance across the interface between the molten aluminum and the cell floor is much lower than where the cell floor is formed by bare carbon. Thus, it should be possible to operate the cell with reduced electrical power requirements.

Furthermore, the special cell floor materials are wetted by molten aluminum. Accordingly, the usual thick metal pad should no longer be required, and molten aluminum may be maintained on the cell floor as a relatively thin film. This can be conveniently carried out using a "drained cathode" configuration where molten aluminum is continuously drained off of the cathode as the aluminum is electrolytically reduced.

By using a drained cathode design, the substitution of a relatively thin film of molten aluminum for the conventional metal pad eliminates a source of electrical resistance in the cell. In addition, the anode-cathode working distance across the bath can be shortened considerably by going to a drained cathode design, which would reduce the electrical resistance of the cell still further, and would also permit the most efficient anode-cathode working distance to be utilized.

In general, the prior art has recognized the potential of these special RHM cell floor materials to improve cell operating efficiency and reduce electrical power requirements, particularly in conjunction with the employment of drained cathodes. However, there are still other benefits to be derived from the use of these RHM materials.

One such benefit relates to the tendency in conventional cells to experience sidewall erosion, which can sometimes go so far as to result in a serious leak requiring the operation of the cell to be shut down. In a typical cell where this happens, the sidewalls comprise an interior liner built up from carbon products much in the same way as the cell floor. The problem arises as carbon in this liner reacts with molten aluminum in the metal pad to form an aluminum carbide film or layer on the sidewall surfaces in contact with the pad. Once formed, this aluminum carbide film or layer acts as a barrier to further reaction. Aluminum carbide, however, is soluble in molten cryolite. Thus, as the carbided sidewall surfaces are brought into contact with the bath, the aluminum carbide film or layer dissolves and washes away, exposing bare sidewall carbon for reaction with aluminum. In the typical conventional cell, the sidewall carbon is constantly subject to alternate contact with cryolite and molten aluminum, due to pad turbulence, for example, or to the rise and fall of the pad height as produced aluminum accumulates and is subsequently tapped off. In the course of such alternate cryolite and molten aluminum contact, the sidewall liner carbon is gradually eroded away.

Obviously, however, if the pad is eliminated by going to a drained cathode design, sidewall erosion should no longer be a problem.

Another benefit to be derived from the use of the special RHM cell floor materials is an expected increase in the feasibility of using graphite as a material of construction for the cell floor.

As contrasted with conventional cell floor materials, such as anthracite or mixtures of anthracite and graphite, graphite has a considerably higher electrical conductivity. Also, graphite is a superior material from the standpoint of resistance to growth and expansion, and to cracking, due to thermal effects and chemical attack in the reduction cell environment.

There are, however, certain problems to be associated with the use of graphite. For one thing, it is more expensive than the conventional materials. In addition, it is subject to being eroded through mechanical abrasion by the cell contents and particularly by the abrasive action of a turbulent metal pad.

But, if a graphite cell floor can be suitably covered by the special RHM materials, all of these problems, save the one of expense, can be minimized, if not eliminated. Since molten aluminum would primarily contact the highly wettable RHM materials, the relative non-wettability of the graphite would not be important. Since the graphite would be substantially covered by the abrasion-resistant RHM materials, it would not itself be significantly exposed to the mechanical forces of abrasion. Further, if a drained cathode design is employed, then the conventional metal pad will be eliminated as the chief source of harmful abrasive action.

While some of the potential benefits of using the RHM materials in cell floor constructions have been recognized for some time, in practice they have been elusive and most difficult to attain.

In the more serious prior art proposals, the cell floor is built up using conventional techniques with carbon products to form an electrically conductive bed. Embedded in this carbonaceous bed are a number of current collector bars, usually made of steel, but occasionally of RHM materials, which protrude from the cell for connection to the external electrical power source.

The configuration of the cell floor has been variously shown as a conventional horizontal surface or, preferably, as a drained cathode design. For a drained cathode, the cell floor may comprise one or more inclined surfaces each of which leads to a channel or a well to collect the drained metal. Alternatively, the cell floor may comprise a horizontal surface with one or more holes, passages, inclined grooves or channels to effect the cathode drainage.

The prior art has suggested a number of ways to employ the special RHM cell floor materials to complete the construction of these various cell floor designs. Typically, the special materials are employed as shapes, such as bars or plates, or even as small particles, made either by hot pressing or by cold pressing and sintering RHM powders.

In some of the prior art proposals, RHM bars or other elements, such as bars or elements made of titanium diboride-aluminum nitride ($TiB_2$—AlN), are situated deep within the structure of the cell floor or within the sidewalls of the cell, and extend into the cell interior to make contact with the electrolytic bath. These bars or elements may terminate within the floor or wall structure and act simply as electrically conducting elements. Or, they may terminate outside of the cell and function as current collector bars. Or, they may terminate within the floor or wall structure and there connect with current collector bars, which in turn terminate outside of the cell.

One objection to this type of arrangement is that the RHM materials will usually be subjected to adverse temperature gradients and corrosion and will tend to fracture. While RHM materials have very high compressive strength, they are quite brittle and pressed shapes often become mechanically unstable if exposed to thermal shock. Additionally, in alumina reduction cells, elemental alkali, mostly in the form of sodium, tends to permeate the porous materials of the cell liner. At temperatures of about 880° C., which exist within the cell liner, the sodium begins to form compounds, including eutectic compounds, with the bath constituents. Experiments have shown that the formation and crystallization of these compounds will tend to corrode and fracture an RHM element situated within the cell liner in the vicinity of the 880° C. isotherm.

Another objection to this type of arrangement is that the cathode does not comprise the continuous, flat surface required for optimum electrolytic efficiency and even consumption of the anode.

In accordance with other prior art proposals, RHM particles are contained in a carbonaceous binder and applied as a layer to the cell floor. An objection to this type of arrangement is that the carbonaceous binder material is commonly subject to chemical attack, and the expected service life is correspondingly low. Another objection is that the presence of the binder decreases the degree of wettability by molten aluminum.

It is accordingly believed that a better and more practical arrangement should incorporate discrete RHM shapes, such as tiles, fastened or bonded to a built up carbonaceous bed to define a cell floor and cathode.

Each of these RHM shapes should be employed in a substantially uniform temperature region within the cell so as to avoid thermal shock. Hence, the shapes should be relatively thin in the sense that they will not protrude significantly either into or out from the cell wall or floor surfaces to which they are attached.

The RHM shapes should further be employed within the hotter regions of the operating cell and away from the 880° C. isotherm.

Furthermore, it is preferred that the shapes be employed so as to substantially cover the cell floor and provide a cathode characterized by essentially continuous flat refractory surfaces for contacting molten aluminum.

While the construction of such a cell has been heretofore contemplated by the prior art, the major problem has been to find a way to satisfactorily fasten or bond the shapes to the carbonaceous cell floor.

One requirement is that at cell operating temperatures, e.g., about 930° to 975° C., the bonding means should provide a good electrically conducting connection between the RHM shapes and the carbonaceous substrate. This suggests the possibility of using carbonaceous pastes or cements, such as are conventionally used to build a cathode structure with carbon blocks.

Another requirement, however, is that the bond should be strong mechanically. More particularly, it should be compatible with installing the RHM shapes at room temperature followed by heating the cell to the high temperatures of operation.

However, experiments have shown that RHM materials, i.e., $TiB_2$ and $TiB_2$—AlN, will not consistently stay bonded to a carbonaceous substrate in a reduction cell operating environment when such pastes or cements are used.

It was against this background that this invention was made.

SUMMARY OF THE INVENTION

This invention is directed to the problem of how to provide an electrically conductive refractory surface on a built up carbonaceous bed to define an alumina reduction cell floor and cathode.

As a solution to the problem addressed, this invention provides a cathode in which one or more special composite tiles are bonded to the carbonaceous bed using a carbonaceous cement, preferably a graphitic cement. These special tiles are characterized by a layer of a refractory hard metal (RHM) material bonded to a base layer of a graphitic material, where the RHM layer comprises a hot pressed mixture of titanium diboride and aluminum nitride powders. These tiles are further characterized by the bond between the RHM layer and the graphitic base layer, such bond having been produced simultaneously as the RHM layer is formed by hot pressing the mixture of titanium diboride and aluminum nitride powders directly against the graphitic base layer. The graphitic base layer of the tiles is bonded to the carbonaceous bed by means of the cement, and the RHM layer of the tiles thereby provides a refractory cathode surface for contacting molten aluminum.

With reference to the RHM layer of these tiles, the volumetric proportion of titanium diboride to aluminum nitride can be in the range of about 2:3 to about 3:2, and is preferably about 1:1. In forming this RHM layer, the titanium diboride and aluminum nitride powder mixture should be hot pressed to at least about 85% of its theoretical density, and preferably to at least about 95% of its theoretical density.

Preferably, the RHM layer will contain $TiB_2$ and AlN in volumetric proportion of about 1:1 hot pressed to a density of at least about 3.7 gm/cc.

The graphitic base layer material is preferably selected so as to minimize specific resistivity in the direction perpendicular to the plane of the tile, but yet be compatible with the RHM layer in terms of thermal expansion coefficients in directions parallel to the plane of the tile, to avoid cracking the RHM layer on cooling after hot pressing.

Preferably, the composite tiles will each be set within a recess in the substrate to which they are bonded, with the interface between the RHM layer and the graphitic base layer of each tile being disposed below the substrate surface.

The carbonaceous bed for the cathode of this invention can be built up using carbon products in the same manner as is done in building up the floor in a conventional alumina reduction cell. For example, the bed can be a monolithic structure formed by using a rammed mixture of finely ground carbonaceous material and pitch. But preferably, the bed will be built up using a number of carbonaceous blocks bonded together with a carbonaceous cement.

The special composite tiles can be directly bonded to such carbonaceous blocks, by means of a carbonaceous cement, to provide construction blocks in accordance with this invention for constructing a cathode for an alumina reduction cell.

Preferably, the carbonaceous bed for the cathode of this invention will be made of graphite and will be built up using a number of graphite blocks bonded together with a graphitic cement.

The alumina reduction cell which is made in accordance with this invention will preferably employ a drained cathode design.

BRIEF DESCRIPTION OF THE DRAWINGS

In the appended drawings:

FIG. 1 is a perspective view of a composite tile for the uses described herein;

FIG. 2 is a perspective view of a composite tile for the uses described herein, illustrating directions perpendicular and parallel to the plane of the tile;

FIG. 3 is a sectional view of a composite tile for the uses described herein, with the composite tile bonded to the surface of a carbonaceous substrate;

FIG. 4 is a sectional view of a composite tile for the uses described herein, with the composite tile set within a recess in a carbonaceous substrate;

DETAILED DESCRIPTION OF PREFERRED EMBODIMENTS

Figure 5:
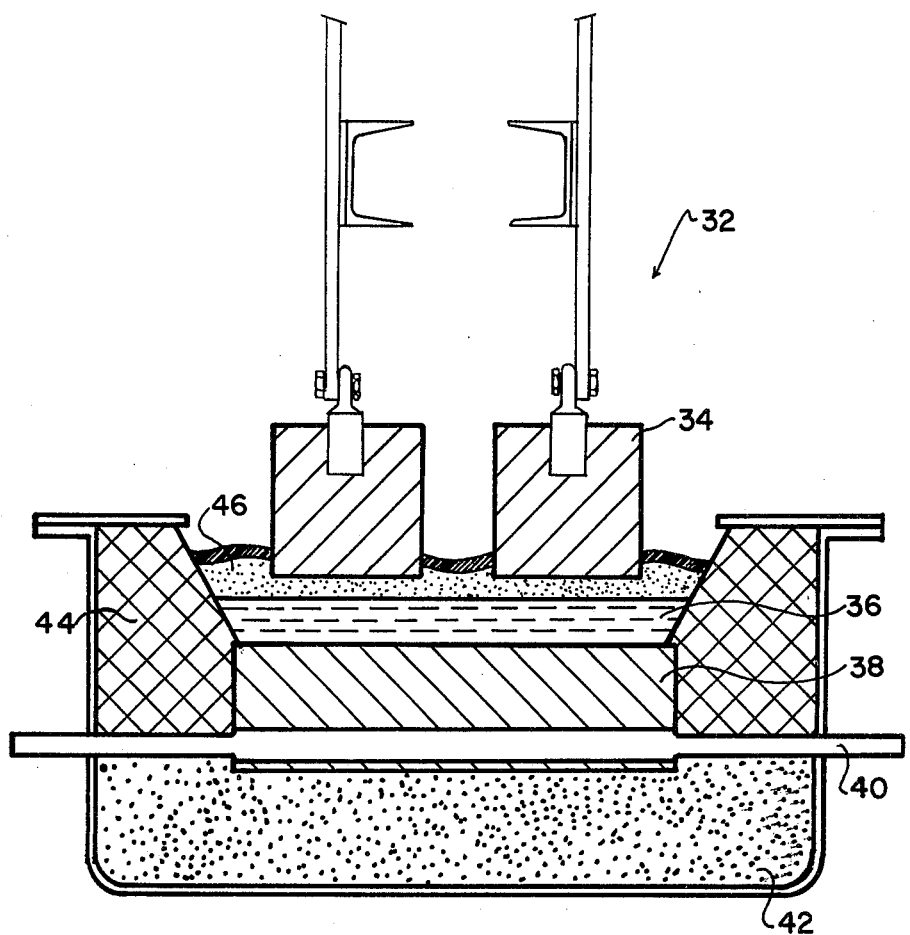
FIG. 5 is a sectional view of a conventional alumina reduction cell with prebaked anodes.

With reference to FIG. 1, an electrically conductive composite tile 10 is shown. The tile 10 presents a refractory surface and can be readily bonded to a carbonaceous substrate with the aid of carbonaceous cements. The tile 10 is thus especially adapted for making cathodes and cathode construction blocks for use in alumina reduction cells, including special alumina reduction cells which employ drained cathode designs, as provided by this invention.

The tile 10 is characterized by a layer 12 of an RHM material bonded to a base layer 14 of a graphitic material, where the RHM layer 12 comprises a hot pressed mixture of titanium diboride and aluminum nitride powders. The tile 10 is further characterized by the bond between the RHM layer 12 and the graphitic base layer 14. This bond is produced simultaneously as the RHM layer is formed by hot pressing the mixture of titanium diboride and aluminum nitride powders directly against the graphitic base layer.

$TiB_2$-AlN mixtures and methods for hot pressing them to produce densified RHM shapes are well known in the prior art. See, for example, U.S. Pat. No. 3,251,700 to V. Mandorf, Jr. and U.S. Pat. No. 3,328,280 to N. E. Richards et al.

It has been found that for making the RHM layer 12, the volumetric proportion of $TiB_2$ to AlN can be in the range of about 2:3 to about 3:2. Mixtures outside this range may have acceptable utility, however. But it should be noted that as the proportion of $TiB_2$ is increased, both thermal shock resistance and bondability to the graphitic base layer 14 can be expected to suffer. Also, as the proportion of AlN is increased, electrical conductivity can be expected to decrease. The preferred volumetric proportion of $TiB_2$ to AlN is about 1:1 (equivalent to about 58% $TiB_2$ and about 42% AlN, by weight).

Satisfactory densification of the RHM layer 12 can be achieved under appropriate pressing conditions by using $TiB_2$ and AlN powders having similar particle size distributions, where the maximum particle sizes do not exceed about 45 microns. For example, $TiB_2$ powders having a maximum particle size of about 45 microns can be used, and preferably the maximum particle size will be in the range of about 15 to about 25 microns. AlN powders having a maximum particle size in the range of about 10 to about 65 microns can be used, with the preferred maximum particle size being about 45 microns.

The recommended minimum purity level for the $TiB_2$ powders is about 98.5% by weight, and for the AlN powders it is about 95% by weight, with recommended maximum impurity limits of 2% C, 1% $TiO_2$ and 1% $Al_2O_3$.

Prior to pressing, the $TiB_2$ and AlN powders should be thoroughly mixed. This can be accomplished using a conventional rotary ball mixer loaded with glass balls, or, preferably with $TiB_2$ balls. Dry ball mixing with glass balls for about fifteen hours, for example, has proven to be a satisfactory procedure. Nonaqueous volatile lubricants which assist and improve homogeneity may be useful as mixing aids.

To minimize cracking during use of these tiles, due to the brittleness of the RHM materials, the RHM layer 12 may be reinforced with carbon, graphite, or silicon carbide fibers or particles, which are added to the powders prior to hot pressing. When fibers are employed, the fibers may be random or uniform in length and are oriented in the plane perpendicular to the direction of hot pressing. The fibers or particles act to resist tensile stresses that could result in cracking during use.

The hot pressing operation, which simultaneously compacts and sinters the $TiB_2$ and AlN powdered mixture to form the RHM layer 12 and produces the bond between the RHM layer 12 and the graphitic base layer 14, can be conveniently carried out in a conventional graphite hot pressing die mounted in a press and surrounded by a susceptor, insulation and induction heating coils. Pressure can be applied by a conventional graphite plunger which conforms to the shape of the molding hole of the die. Preferably, the die and plunger will be made of a strong, high density graphite with smooth, polished surfaces that avoid sticking to the workpiece. ATJ graphite manufactured by the Union Carbide Corporation has been found to be well-suited for this purpose.

In a typical hot pressing sequence, the graphitic base layer 14, in the form of a pre-formed graphite tile, is loaded into the molding hole of the die. A free flowing mixture of $TiB_2$ and AlN powders in the proper proportion is then loaded into the die on top of the graphitic base layer 14. The mixture can then be preliminarily compacted by the graphite plunger under an applied load of about 1000 pounds per square inch (7.03 kilograms per square centimeter) while the system temperature is raised to about 1200° C. This will bring the mixture density up to about 60% of theoretical. The pressure can then be increased to about 2000 to 4000 pounds per square inch (14.06 to 28.12 kilograms per square centimeter) while the temperature is raised to about 1900° C. for about 20 to 120 minutes to complete densification of the RHM layer 12 and the bonding of the RHM layer 12 to the graphitic base layer 14. To minimize the tendency of the tile 10 to crack, and to ensure a good bond between the RHM layer 12 and the graphitic base layer 14, pressure should be maintained in excess of about 2000 pounds per square inch (14.06 kilograms per square centimeter) while the system is allowed to cool. To monitor temperatures, an iridium, iridium-rhodium thermocouple can be used.

Although hot pressing is often done under a vacuum, it is best to hot press $TiB_2$-AlN in an inert atmosphere, such as argon. Otherwise, unwanted vaporization of the aluminum nitride may occur at the high hot pressing temperatures.

While the tiles can be hot pressed separately as described, it is more economical to hot press a stack of tiles at the same time. The tiles can be prevented from sticking to one another by inserting appropriate parting materials between tiles before hot pressing begins. Grafoil ® sheets manufactured by the Union Carbide Corporation, for example, can be used for this purpose.

It will be appreciated that the tiles can be produced under a variety of pressing conditions, including, possibly, conditions other than those stated above. In any case, pressure, temperature and time-at-temperature should all be sufficient in combination to compact the $TiB_2$-AlN mixture to at least about 85%, and preferably about 95%, of theoretical density. Upper limits on pressure are mostly governed by the strength of the die, while upper limits on temperature are controlled by the sublimation point of the aluminum nitride constituent. And the cummulative effect of temperature and time-at-temperature must be watched to avoid undue grain or crystallite growth.

In accordance with the presently preferred practice using a particular graphite die, hot pressing after preliminary compaction is carried out at temperatures of about 1810° to 1890° C., e.g. about 1850° C., for about 30 to 60 minutes, e.g., about 30 minutes, while holding pressure at about 2700 to 3300 pounds per square inch (18.98 to 23.20 kilograms per square centimeter), e.g., about 3000 pounds per square inch (21.09 kilograms per square centimeter).

Using this practice, presently preferred embodiments of the tiles have been produced. In these tiles, $TiB_2$ and AlN are mixed in approximately equal volumetric proportions and are compacted to a density in excess of about 3.7 gm/cc (about 95% of theoretical). With reference to FIG. 2, the resulting RHM layer is characterized by coefficients of thermal expansion within the range of about $5 \times 10^{-6}$ to about $7 \times 10^{-6}/°C$. in all directions parallel to the plane of the tile, e.g., directions 16 in the FIGURE, and by a specific room temperature resistivity in the range of about $4 \times 10^{-4}$ to about $8 \times 10^{-3}$ ohm-cm. (As used herein, the term "coefficient of thermal expansion" or "CTE" means the average derivative of unit dimension with respect to temperature over the range of nominal temperatures from room temperature to about 1000° C.) The ceramal layer is further characterized by being chemically inert and mechanically stable in alumina reduction cell operating environments.

With reference again to FIG. 2, the material for the graphitic base layer 14 should be selected with a view towards minimizing specific resistivity in the direction normal to the tile plane, i.e., direction 18 in FIG. 2. Experience has shown, however, that graphites with lower resistivities will often be characterized by CTEs which tend to diverge from the CTEs of the RHM layer 12 in the directions 16. Depending upon the dimensions of the tile 10 and its component layers, CTE mismatch of this kind can cause the RHM layer 12 to crack on cooling down from hot pressing temperatures. The following examples will illustrate.

EXAMPLE 1

In this example, four tiles were produced using HLM grade graphite manufactured by the Great Lakes Carbon Corporation for the graphitic base layer. The RHM layer for each of the four tiles was made using a 1:1 volumetric proportion of $TiB_2$ to AlN.

The first tile measured 2.0 in $\times$ 2.0 inches (5.080 $\times$ 5.080 centimeters) and had a 0.375 inch (0.953 centimeter) thick RHM layer and a 0.750 inch (1.905 centimeter) thick graphitic base layer. The CTEs of the RHM layer ranged from $5.03 \times 10^{-6}$ to $5.81 \times 10^{-6}/°C$. in directions parallel to the tile plane. This tile formed crack free.

The second tile measured 5.0 $\times$ 4.0 inches (12.70 $\times$ 10.12 centimeters) and had a 0.250 inch (0.635 centimeter) thick RHM layer and a 1.0 inch (2.540 centimeter) thick graphitic base layer. The CTEs of the RHM layer in this case ranged from $5.56 \times 10^{-6}$ to $7.53 \times 10^{-6}/°C$., and the RHM layer cracked normal to the tile plane on cooling after hot pressing.

The third tile measured 5.5 $\times$ 3.0 inches (13.970 $\times$ 7.620 centimeters) and had a 0.250 inch (0.635 centimeter) thick RHM layer and a 0.750 inch (1.905 centimeter) thick graphitic base layer. The CTEs of the RHM layer were the same as those in the first tile, and the tile formed crack free.

The fourth tile measured 6 $\times$ 6 inches (15.240 $\times$ 15.240 centimeters) and had a 0.250 inch (0.635 centimeter) thick RHM layer and a 1.00 inch (2.540 centimeter) thick graphitic base layer. The CTEs of the RHM layer were the same as those in the first and third tiles, but the RHM layer cracked after hot pressing.

The HLM grade graphite used was characterized by CTEs ranging from $3.27 \times 10^{-6}$ to $5.07 \times 10^{-6}/°C$. in directions parallel to the tile plane, and by a specific room temperature resistivity of about $2.1 \times 10^{-3}$ ohm-cm in the direction normal to the tile plane.

The results show that for the HLM grade graphite, the ability to produce crack free tiles was a function of the CTEs of the RHM layer (which vary somewhat according to hot pressing conditions) and the physical dimensions of the tiles.

EXAMPLE 2

In this example, two tiles were produced using 9429 grade graphite manufactured by Airco Speer, Inc. for the graphitic base layer. The composition of the RHM layer of these tiles was the same as that used in EXAMPLE 1.

The first tile was the same in all respects as the second tile in EXAMPLE 1 (which cracked), with the exception of the graphite type. This tile formed crack free.

The second tile was the same as the first tile in this example, except that its dimensions were the same as those of the fourth tile in EXAMPLE 1 (which cracked). This tile formed crack free.

The 9429 grade graphite used was characterized by CTEs of about $5.94 \times 10^{-6}/°C$. in directions parallel to the tile plane, and by a specific room temperature resistivity of about $8.5 \times 10^{-3}$ ohm-cm in the direction normal to the tile plane.

The results in this example, when compared to those in EXAMPLE 1, show that ability to form crack free tiles can be improved by more closely matching the CTEs of the graphitic base layer to those of the RHM layer. It is also seen, however, that graphites with better suited CTE values often have higher electrical resistivities.

EXAMPLE 3

In this example, one tile was produced using H-463 grade graphite manufactured by the Great Lakes Carbon Corporation for the graphitic base layer.

This tile was the same in all respects as the fourth tile in EXAMPLE 1 (which cracked), with the exception of the graphite type. This tile formed crack free.

The H-463 grade graphite used was characterized by CTEs ranging from $7.24 \times 10^{-6}$ to $8.10 \times 10^{-6}/°C$. in directions parallel to the tile plane, and by a specific room temperature resistivity of about $2.9 \times 10^{-3}$ ohm-cm in the direction normal to the tile plane.

Based on the foregoing examples, it is seen that various graphites suitable for producing the larger sized, crack free tiles are characterized by CTEs within the range of about $5 \times 10^{-6}$ to about 8.5 to $10^{-6°}$ C. in directions parallel to the tile plane, and by a specific room temperature resistivity of less than about $1.0 \times 10^{-2}$ ohm-cm in the direction normal to the tile plane. Of such graphites, the H-463 grade graphite is the presently preferred material, primarily because of its lower electrical resistivity. Hence, the preferred graphite is one characterized by CTEs within the range of about $7 \times 10^{-6}$ to about $8.5 \times 10^{-6}/°C$. in directions parallel to the tile plane, and by a specific room temperature resistivity of less than about $4 \times 10^{-3}$ ohm-cm in the direction normal to the tile plane. While cracking of the RHM layer has not yet been established as being detrimental in terms of the utility or performance of the tiles, crack free tiles are nevertheless presently preferred.

Prior to the hot pressing, the graphitic surface to be bonded to the RHM layer is desirably roughened mechanically and then air cleaned to facilitate the bonding.

If desired, the graphitic base layer can be machined to provide one or more grooves or holes, particularly undercut grooves or holes, in its surface for binding to the RHM base layer. This will increase the surface area of bonding for a given size tile, and, where the grooves or holes are undercut, will increase bond strength by means of a mechanical keying effect. These grooves or holes in the graphitic base layer can be allowed to fill with $TiB_2$-AlN powdered mixture which gets densified during hot pressing of the RHM layer, or they can be plugged with predensified $TiB_2$-AlN shapes which bond to the RHM layer during hot pressing.

When employed in alumina reduction cells as refractory cathode surfaces, the tiles preferably have a RHM layer which is about 0.250 to about 0.375 inch (0.635 to 0.952 centimeters) thick and a graphitic base layer which is about 0.750 to about 1.00 inch (1.905 to 2.540 centimeters) thick. The tile can be made to most any shape, the square or rectangular shapes being presently preferred. Typical nominal tile sizes are $2\times2$ inches (5.080$\times$5.080 centimeters), $5\times5$ inches (12.700$\times$12.700 centimeters), $6\times6$ inches (15.240$\times$15.240 centimeters), or $12\times12$ inches (30.480$\times$30.480 centimeters), as requirements dictate. The amount of $TiB_2$-AlN powdered mixture to use in forming the RHM layer can readily be estimated based on the desired dimensions and the estimated ultimate density after hot pressing.

Referring now to FIG. 3, a composite tile 10 is shown bonded to a carbonaceous substrate 20. The RHM layer 12 presents a refractory surface 22, and the graphitic base layer 14 is bonded to the substrate 20 by means of a carbonaceous cement 24. For applications in alumina reduction cells and similar environments, the best presently known cements, for use as the cement 24, are graphite cements such as C-34 or C-38 cements manufactured by the Union Carbide Corporation; P-544 cement manufactured by the Great Lakes Carbon Corporation; or GC grade cement manufactured by Dylon Industries, Inc. Based on studies, the Dylon graphite cement is presently preferred.

FIG. 4 illustrates the presently preferred manner of attaching a tile 10 to a carbonaceous substrate 20. As shown, the substrate 20 includes a recess 26, and the tile 10 is set within the recess 26 and bonded by cement 24. The interface 28 between the RHM layer 12 and the graphitic base layer 14 is disposed within the recess 26 and below the adjacent exterior surface 30 of the substrate 20.

Alternatively, a composite tile with beveled side edges can be set and cemented within a substrate recess with undercut sidewalls to mechanically assist in holding the tile in place. Additionally, special RHM screws or bolts can be used as an added precaution to hold the tiles in place.

As detailed in examples to follow, experiments were conducted which show that the composite tiles described herein are well-suited for use in an alumina reduction cell cathode construction. These experiments also included comparative studies of other types of refractory tiles cemented to a carbonaceous substrate. The comparative tiles consisted of $TiB_2$-AlN hot pressed to graphite composite tiles; hot pressed $TiB_2$ tiles; and hot pressed $TiB_2$-AlN tiles.

For each of these experiments, a bench scale alumina reduction cell was employed using a $2\times2$ inches (5.080$\times$5.080 centimeters) nominal size test tile cemented to a graphite holder as the cathode. To simulate commercial scale reduction cell operating conditions, the test tile and holder were immersed in a molten aluminum pad. On the pad was floated an electrolytic bath comprising 8% $CaF_2$ and 7% $Al_2O_3$ by weight, balance cryolite, with a 1.45 weight ratio. A thirty ampere current was used, corresponding to an average cathode current density of about 7.5 ams/in$^2$ (1.2 amps/cm$^2$) and the cell temperature was maintained at 965° to 985° C. The experiments were run with a 2.250 inch (5.715 centimeters) diameter prebaked carbon anode "working" during the day and shorted out into the metal pad overnight.

EXAMPLE 4

For this example, two $TiB_2$-AlN hot pressed to graphite tiles were cemented to graphite holders in the fashion illustrated in FIG. 4. The volumetric proportion of $TiB_2$ to AlN in the RHM layer of each tile was about 1:1, and the RHM layer was about 0.375 inch (0.953 centimeter) thick for each tile and the graphitic base layer was about 0.750 inch (1.905 centimeters) thick.

The two tiles were respectively tested for 168 hours and 237 hours. In both cases, the tile was firmly attached to the graphite holder and there was no sign of deterioration of the hot pressed bond.

EXAMPLE 5

For this example, two $TiB_2$-AlN hot pressed to graphite tiles were cemented to graphite holders in the fashion illustrated in FIG. 3. The volumetric proportion of $TiB_2$ to AlN was again about 1:1, and the RHM layer of each tile was about 0.375 inch (0.953 centimeters) thick and about 1.00 inch (2.540 centimeters) thick for the two tiles respectively.

The two tiles were each tested for about 720 hours. In both cases, the tile was firmly attached to the graphite holder and there was no sign of deterioration of the hot pressed bond.

Surprisingly, it was discovered in running the experiments in this example, and those in EXAMPLE 4, that the graphitic base layer of the $TiB_2$-AlN hot pressed to graphite tiles was fully penetrated by elemental sodium and bath constituents within the first few days of testing. (Final analysis of the graphitic base layer showed 20% non-carbonaceous material by weight). That the tiles remained intact during these tests illustrated and confirmed that there is no natural mechanism in an alumina reduction cell environment for the degradation of the hot pressed $TiB_2$-AlN hot pressed to graphite bond.

EXAMPLE 6

For this example, A $TiB_2$ hot pressed to graphite tile was cemented to a graphite holder in the fashion illustrated in FIG. 3. The $TiB_2$ RHM layer was about 0.333 inch (0.847 centimeters) thick and the graphitic base layer was about 1.00 inch (2.540 centimeters) thick.

This tile was tested for about 168 hours and the $TiB_2$ RHM layer was found to have cracked into pieces and had become detached from the graphitic base layer. This experiment confirmed earlier tests showing that $TiB_2$ cannot be hot pressed to graphite to give a stable joint.

It is consistent with the currently held belief that a mechanism for successful bonding of $TiB_2$-AlN to graphite shown in EXAMPLES 4 and 5 is due in part to the penetration and sintering of micron size particles of aluminum nitride into grain boundaries and imperfections in the graphite bonding surface.

EXAMPLE 7

For this example, a 0.500 inch (1.270 centimeter) thick hot pressed $TiB_2$ tile was cemented to a graphite holder in the manner illustrated in FIG. 3.

The tile was tested for about 336 hours when it detached itself from the graphite holder. There was a layer of aluminum between the tile and the cement, and the cement appeared to have been converted to a layer of yellow aluminum carbide.

EXAMPLE 8

For this example, a 0.750 inch (1.905 centimeter) thick hot pressed $TiB_2$-AlN tile was cemented to a graphite holder in the manner illustrated in FIG. 3. The volumetric proportion of $TiB_2$ to AlN in this tile was about 1:1.

The tile became detached from the graphite holder after about 432 hours of testing, and there appeared to be a layer of aluminum between the tile and the graphite holder and also a layer of $Al_4C_3$.

These results, together with those in EXAMPLE 7, illustrate that compared to $TiB_2$-AlN hot pressed to graphite tiles, simple $TiB_2$ and $TiB_2$-AlN hot pressed tiles cannot be nearly as securely bonded to a carbonaceous substrate using carbonaceous cements.

As further background in respect to uses for this invention, a conventional alumina reduction cell 32 in present commercial use is shown in schematic section in FIG. 5. This cell 32 in practice carries a nominal current load of about 67,000 amps through 24 prebaked carbon anodes 34 which present a total working surface area of about 7600 in$^2$ (49,035 cm$^2$).

Referring to the FIGURE, the cell 32 has a cathode which comprises a molten aluminum pad 36; a flat, horizontally disposed carbonaceous bed 38 which forms the cell floor; and a plurality of steel collector bars 40 which protrude through the sides of the cell 32 for electrical hook up. The carbonaceous bed 38 is typically made up of a number of prebaked carbonaceous construction blocks which are set in place and bonded together with a carbonaceous cement. These blocks are commonly about 17×17 inches (43.180×43.180 centimeters) in section and extend lengthwise over a major portion of the width of the cell 32. A typical composition for these blocks is 76% anthracite coal, 15.5% pitch and 8.5% foundry coke. Each block is normally formed with a lengthwise groove on its underside, and before a block is placed in the cell 32, a collector bar 40 is laid in this groove and is cast in place with molten iron.

The FIGURE shows the carbonaceous bed 38 resting on a layer 42 of particulate alumina insulation which is normally about 8.00 inches (20.320 centimeters) thick. The sidewalls 44 of the cell 32 are commonly formed using a rammed, finely ground carbonaceous mixture consisting of about 85% anthracite coal and 15% pitch by weight.

The cell 32 is shown with the molten aluminum pad 36 supporting the molten cryolite-alumina bath 46. The pad 36 in this cell 32 is normally maintained at a thickness of 3 to 4 inches (7.620 to 10.160 centimeters), and the working distance between the anodes 34 and the pad 36 is usually about 1.80 inches (4.572 centimeters).

Figure 8:
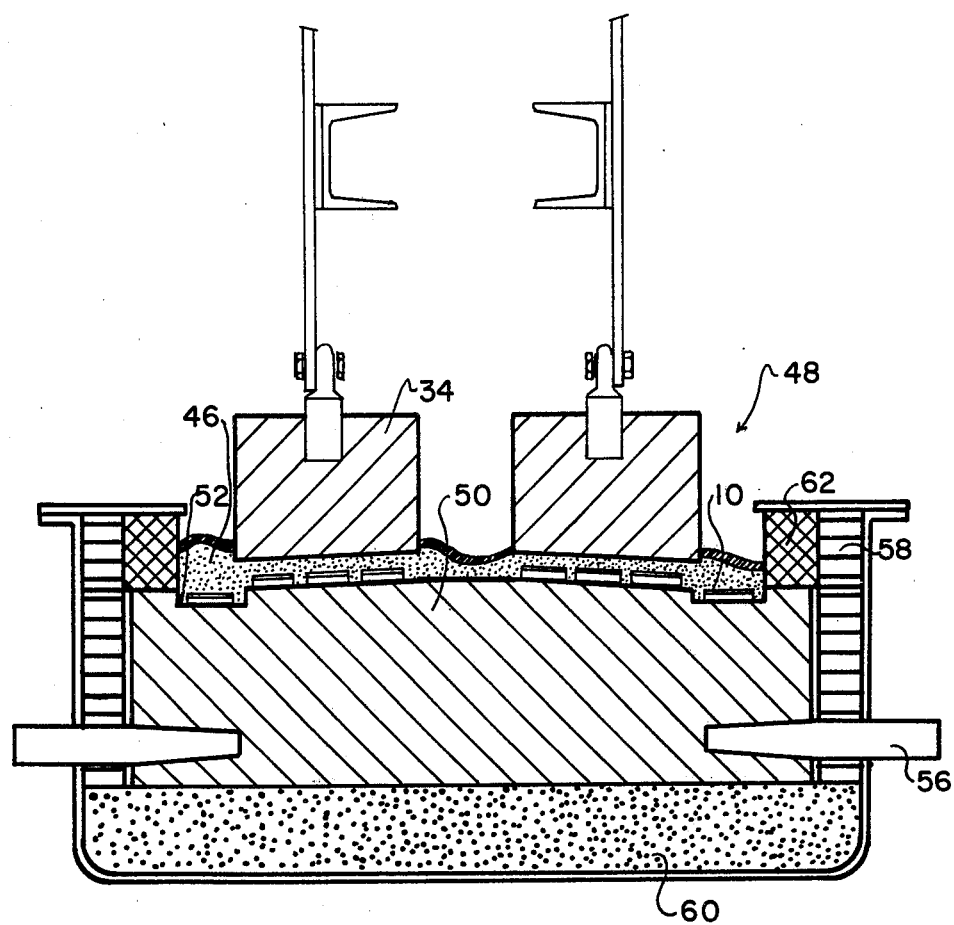
FIG. 8 is a sectional view taken along line B—B of the alumina reduction cell shown in FIG. 6, with composite tiles providing a molten aluminum contacting surface of the cathode thereof.

As an example of how a conventional alumina reduction cell, such as the one shown in FIG. 5, can be retrofitted to employ a special cathode as provided by this invention, reference is made to FIG. 8.

In the illustrated cell 48, the cathode comprises a special carbonaceous bed 50 having surfaces inclined from the horizontal which form the cell floor. To provide molten aluminum contacting surfaces for this cathode, a plurality of the special composite tiles 10 are bonded to the bed by means of a carbonaceous cement, preferably in the manner illustrated in FIG. 4. In the cell 48 with this drained cathode configuration, molten aluminum is maintained as a thin film on the exposed refractory surfaces presented by the tiles 10. As alumina in the bath 46 is electrolytically reduced, the molten aluminum produced is continuously drained off of the central portion of the cathode and into the channels 52. By eliminating the conventional molten aluminum pad, it is conservatively estimated that an anode-cathode working distance of about 1.00 inch (2.540 centimeters) can be used.

The carbonaceous bed 50 is preferably made up of a number of special carbonaceous construction blocks which are set in place and bonded together with a carbonaceous cement, preferably a graphite cement such GC grade graphite cement manufactured by Dylon Industries, Inc. These blocks can advantageously be made of graphite, preferably a graphite such as UCAR grade graphite made by the Union Carbide Corporation. This graphite has a specific room temperature resistivity of about $1.4 \times 10^{-3}$ ohm-cm as compared to about $4 \times 10^{-3}$ ohm-cm for the typical anthracite-pitch-coke composition referred to above. As previously mentioned, graphite is a superior material from the standpoint of resistance to growth and expansion, and to cracking, due to thermal effects and chemical attack in the reduction cell environment.

As a possible alternative to a carbonaceous bed 50 which is made completely of graphite, the uppermost surfaces of the bed 50 might be made of graphite by providing graphite sections, or perhaps graphite inserts, bonded to lower sections of the bed 50 made with the more conventional carbonaceous cathode materials.

Figure 10:
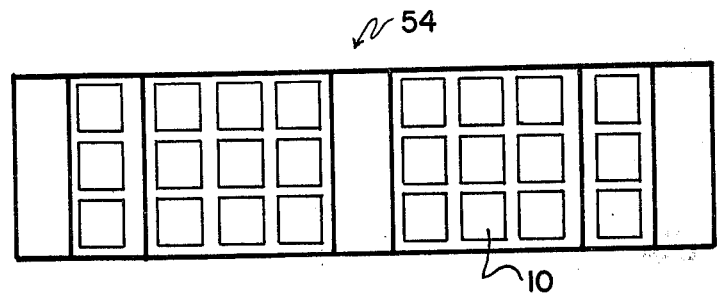
FIG. 10 is a top view of a special construction block for constructing a cathode for the alumina reduction cell shown in FIGS. 6, 7, 8, and 9.
Figure 11:
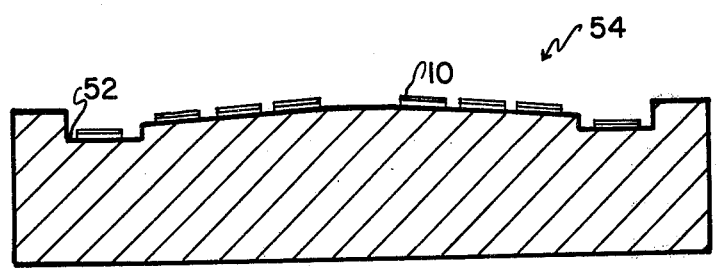
FIG. 11 is a side view of the construction block shown in FIG. 10.

FIG. 10 and FIG. 11 respectively illustrate top and side views of a special carbonaceous construction block 54 for making up the cell 48 shown in FIG. 5. This block 54 can be preformed or machined to have inclined upper surfaces and channels 52 to facilitate drainage. The block 54 is shown fitted with twenty-four of the special composite tiles 10 to provide a molten aluminum contacting surface of the cathode.

Figure 12:
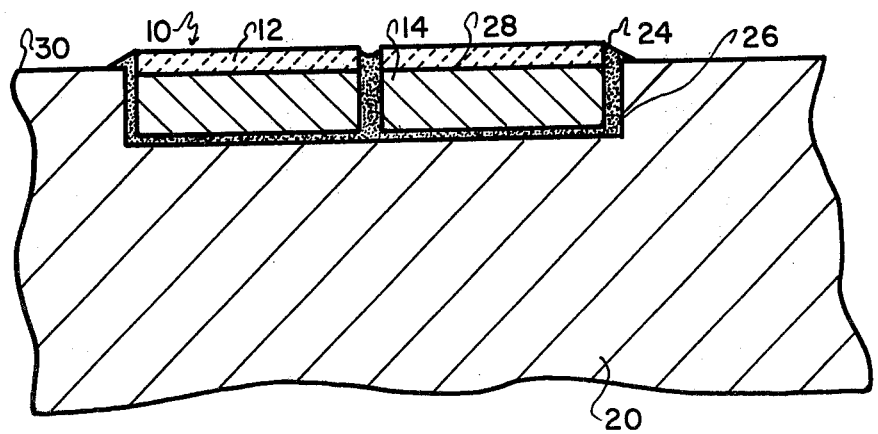
FIG. 12 is a sectional view of a pair of composite tiles for the uses described herein, with the two composite tiles set within a single recess in a carbonaceous substrate.

The tiles 10 are preferably secured to the construction block 54 in the manner illustrated in FIG. 4. Each tile 10 can be set in a separate recess 26, or alternatively more than one tile 10 can be set and cemented in place in each recess 26, to simplify machining. FIG. 12 shows this variation within the basic FIG. 4 concept.

Referring back to FIG. 8, when graphite is used as the material for the carbonaceous bed, it is preferred that short tapered steel collector bars 56 be employed as shown. These bars 56 can be inserted in place and secured, preferably with a graphite cement, after the carbonaceous bed 50 is placed in the cell 48. What is thus avoided is the use of collector bars, such as collector bars 40 as shown in FIG. 5, which run from one side of the cell to the other. Due to considerations involving the thermal expansivities of steel and graphite, this precaution is recommended to prevent the carbonaceous bed 50 from cracking during heat up.

The sidewalls of the cell 48 in FIG. 8 are shown insulated with high $Al_2O_3$ refractory brick 58 of a preferred thickness of at least about 2.500 inches, (6.350 centimeters), and as insulation for the bottom, a 10.00 inches (25.400 centimeters) thick layer 60 of particulate alumina is suggested. The added insulation is recommended in view of the lower electrical resistance across the cell 48, as compared to the cell 32 in FIG. 5, which will cut down on the heat input that keeps the electrolytic process at the proper temperature. The interior sidewalls can suitably be made with 6×6 inches (15.240×15.240 centimeters) prebaked carbon blocks 62.

Figure 6:
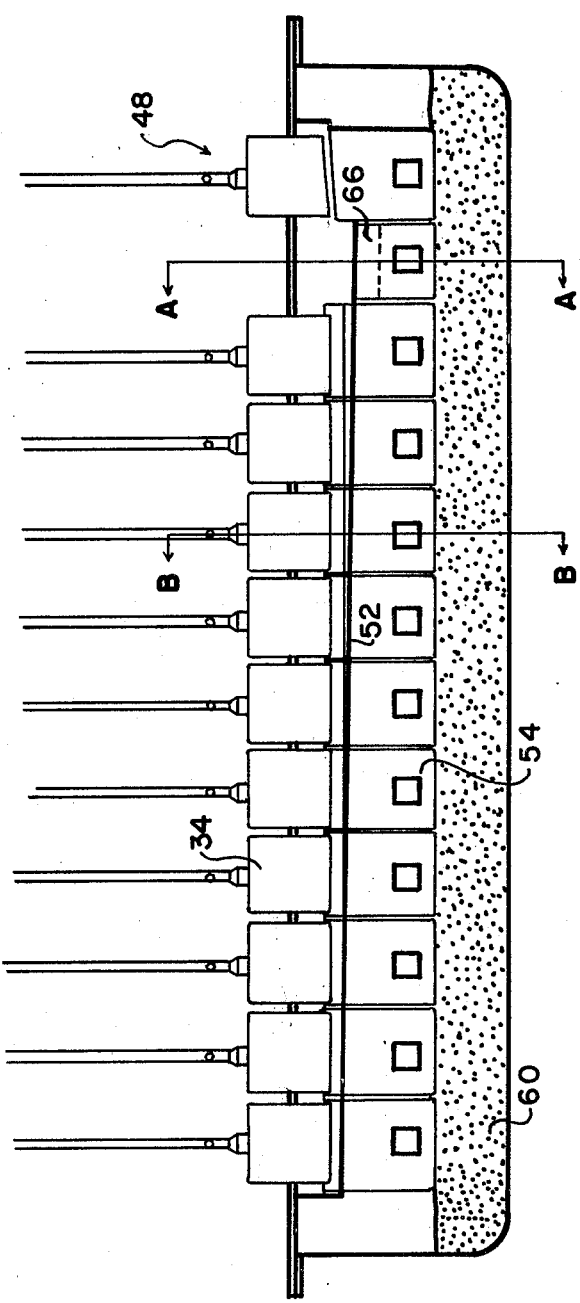
FIG. 6 is a sectional view of a special alumina reduction cell which employed drained cathode design.
Figure 7:
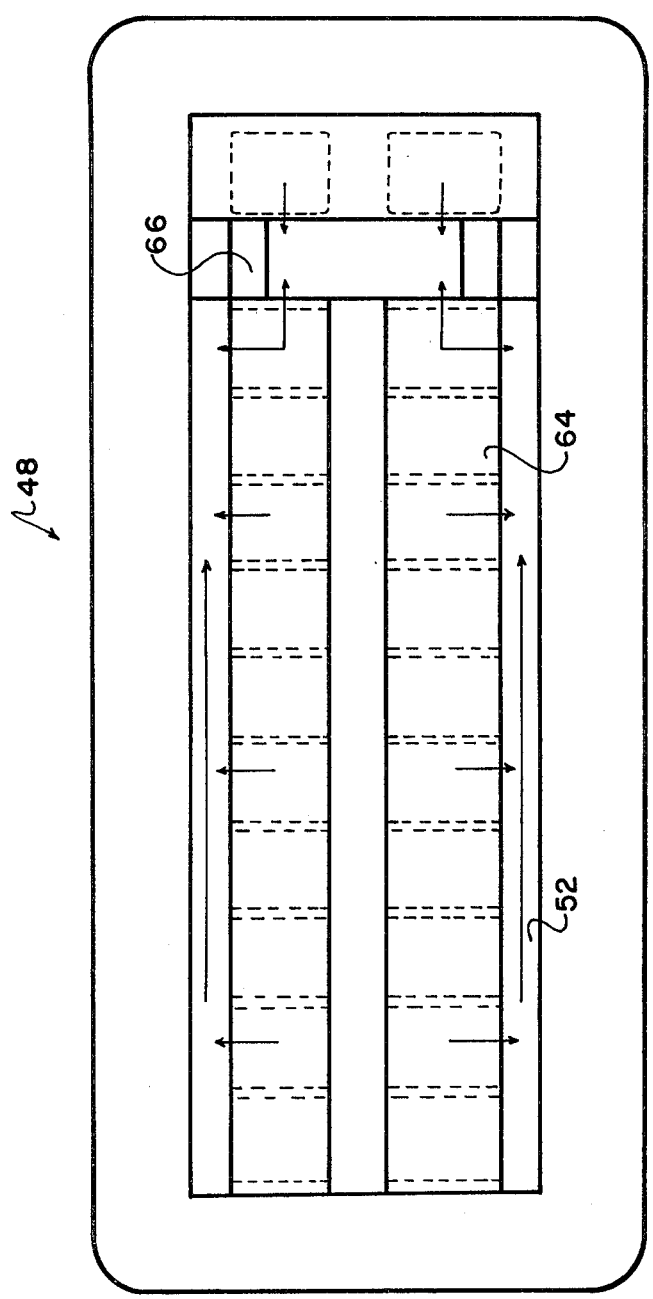
FIG. 7 is a top view, with parts removed, of the alumina reduction cell shown in FIG. 6.
Figure 9:
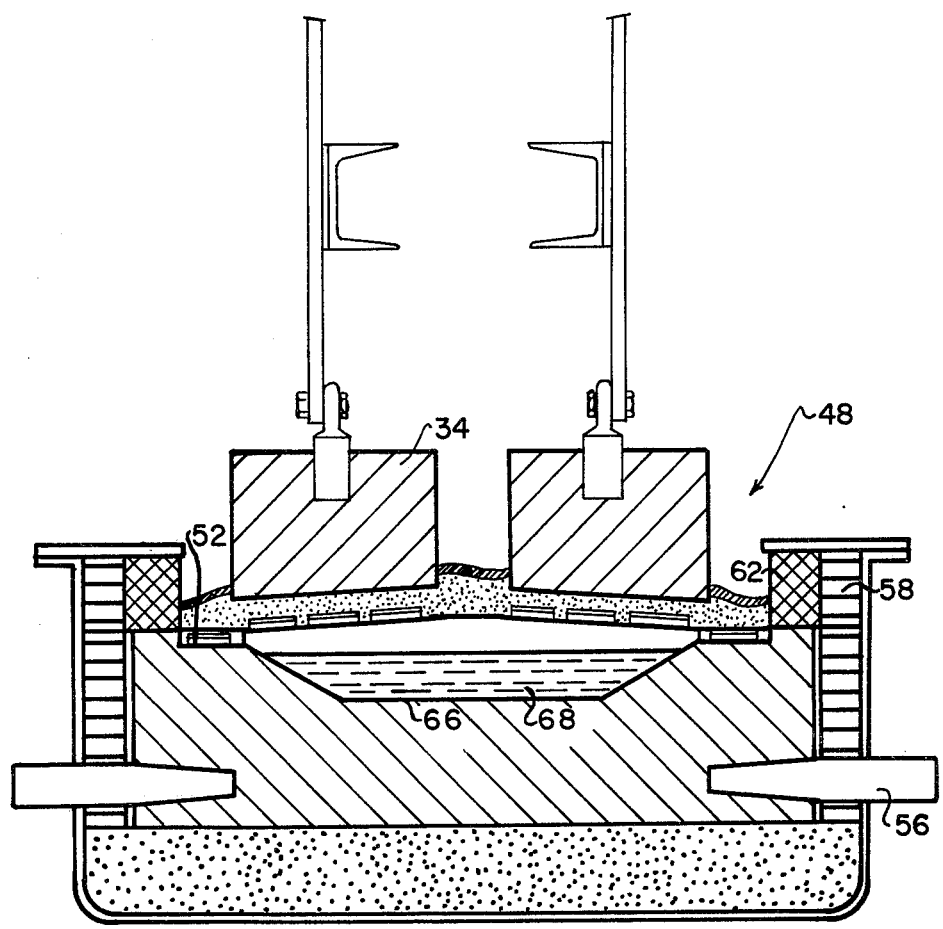
FIG. 9 is a sectional view taken along line A—A of the alumina reduction cell shown in FIG. 6, illustrating a tapping well for the collection of drained molten aluminum.

FIG. 7 provides a top view of the cell 48 in FIG. 5 and shows suggested paths for draining molten aluminum as indicated by the arrows. As the metal drains off of the cathode surfaces 64, it collects in the channels 52, which are inclined toward the end section of the cell to facilitate flow of the metal to the collection well 66. FIG. 6, a sectional side view of the cell 48, and FIG. 9, a sectional view, show the inclination of the channels 52 and the collection well 66 in better detail. Once molten aluminum 68 reaches the collection well 66, as shown in FIG. 9, it can be removed continuously or periodically tapped off.

Figure 13:
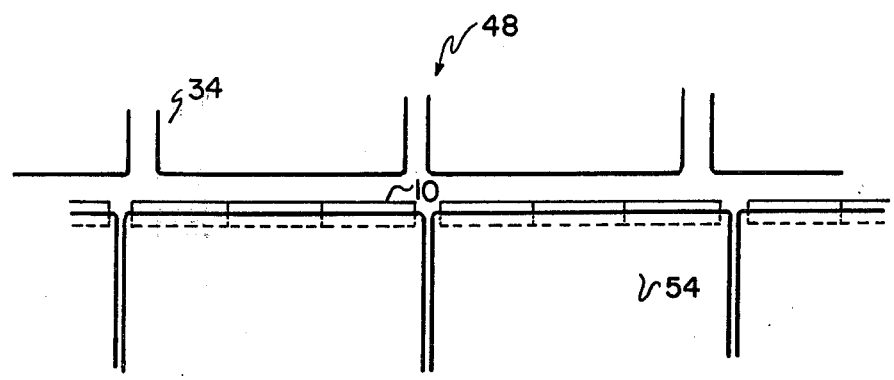
FIG. 13 is a close up view of a portion of the sectional view in FIG. 6 and shows one arrangement for setting composite tiles in cathode construction blocks as described herein.
Figure 14:
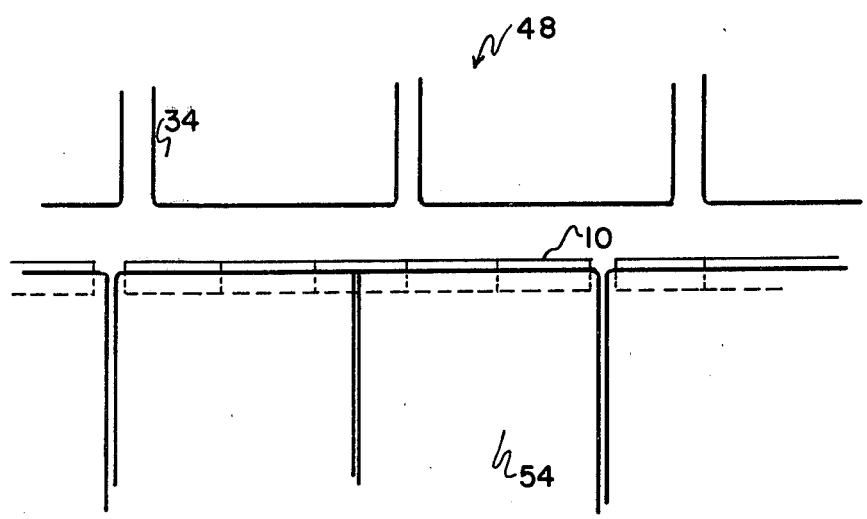
FIG. 14 is a close up view of a portion of the sectional view in FIG. 6 and shows an alternative arrangement for setting composite tiles in cathode construction blocks as described herein.

FIGS. 13 and 14 illustrate a portion of the FIG. 6 sectional view of the cell 48 in greater detail, and show different arrangements for setting the tiles 10 in the cathode construction blocks 54, which can vary according to the physical dimensions of the tiles 10 and the construction blocks 54 that happen to be available.

To compare anticipated operating parameters of the cell 32 shown in FIG. 5 and the special cell 48 shown in FIG. 8, estimates of the voltage and power requirements were made for the two cells. These estimates were based on actual production scale experience, in the case of the cell 32, and bench scale and pilot scale studies, in the case of the cell 48. Assuming anode to cathode working distance of 1.80 inches (4.572 centimeters) for the cell 32, and 1.00 inches (2.540 centimeters) for the cell 48, the following table sets forth the pertinent comparative FIGURES:

| ANTICIPATED CELL VOLTAGE AND POWER REQUIREMENTS | | Conventional Cell 32 (FIG. 5) | Special RHM Cell 48 (FIG. 8) |
|---|---|---|---|
| Anode Drop | Volts | 0.397 | 0.397 |
| Cathode Drop | Volts | 0.436 | 0.220 |
| Bath Drop | Volts | 2.044 | 1.233 |
| Decomposition | Volts | 1.220 | 1.220 |
| Anode Overvoltage | | 0.850 | 0.850 |
| Drop Between Cells | Volts | 0.15 | 0.15 |
| For Anode Effects | Volts | 0.09 | 0.09 |
| Total Cell Volts | | 5.287 | 4.160 |
| Ampere Efficiency | Percent | 89.5 | 89.5 |
| DC Kwh/pound-Al | | 7.84 | 6.28 |
| PRECENT POWER SAVINGS | | | 19.9% |

Figure 15:
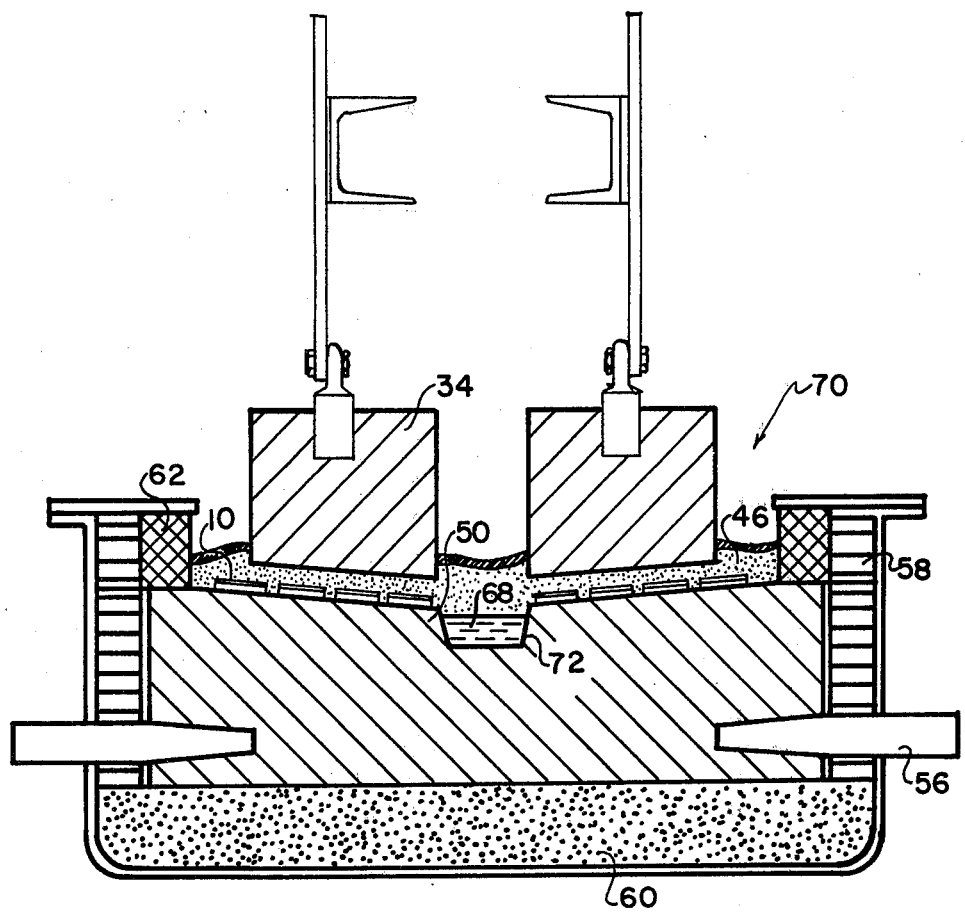
FIG. 15 is a sectional view of an alumina reduction cell similar to the one shown in FIG. 8, except that the molten aluminum product is drained toward the center of the cell cathode.

FIG. 15 shows an alumina reduction cell 70 which is similar to the cell 48 shown in FIGS. 6, 7, and 8. However, in the cell 70, the molten aluminum product 68 is drained off of the tiles 10 toward the center of the cell 70 and into a centrally located collection well 72.

The cathode configuration of the cell 70 may have advantages over that of the cell 48, particularly in the retrofitting of a conventional cell, since a higher effective anode surface area can be employed for a given cell size. (Note that the cell 48, as shown in FIG. 6, omits the two anodes which would be conventionally positioned over the illustrated location of the collection well 66.) On the other hand, a cell 70 in which the maximum effective anode surface area is utilized may be more difficult to maintain in terms of physically having the room to carry out the necessary tapping, crust breaking, and feeding operations.

While the retrofitting of a conventional prebaked anode type cell has been described, this invention has equal application to Soderberg type reduction cells. Also, while primary emphasis has been placed on a drained cathode design, even the conventional cathode designs can be improved in accordance with this invention, since the voltage drop at the metal pad and cell floor interface will be reduced, as will the problem of mechanical erosion when graphitic cell floor construction materials are used.

It should thus be understood that this invention has been herein illustrated and described by reference to a limited number of exemplary embodiments thereof. Accordingly, it will be recognized that innumerable variations, modifications and extensions of these embodiments are possible which nevertheless are within the scope of this invention, which is intended to be measured and limited only by the following claims.

What is claimed is:

1. A cathode for an alumina reduction cell, said cathode comprising a carbonaceous bed and a composite tile, said composite tile being characterized by a layer of an RHM material bonded to a base layer of a graphitic material, said RHM material comprising a hot pressed mixture of titanium diboride and aluminum nitride powders, said composite tile being further characterized by the bond between said layer of an RHM material and said base layer of a graphitic material, said bond having been produced simultaneously as said layer of an RHM material is formed by hot pressing said mixture of said powders directly against said base layer of a graphitic material, said base layer of a graphitic material being bonded to said carbonaceous bed by means of a carbonaceous cement, said layer of an RHM material thereby providing a molten aluminum contacting surface of said cathode.

2. The cathode of claim 1 wherein said carbonaceous bed includes a recess and said composite tile is set within said recess and bonded to said carbonaceous bed by means of a graphitic cement with the interface between said layer of an RHM material and said base layer of a graphitic material being disposed within said recess and below the adjacent exterior surface of said carbonaceous bed.

3. The cathode of claim 1 wherein said carbonaceous bed is constructed from graphite blocks joined together with a carbonaceous cement.

4. The cathode of claim 1 wherein said layer of an RHM material is reinforced with fibers or particles.

5. The cathode of claim 4 wherein said fibers or particles are formed of a material selected from the group consisting of carbon, graphite and silicon carbide.

6. A construction block for constructing a cathode for an alumina reduction cell, said construction block comprising a carbonaceous block and a composite tile, said composite tile being characterized by a layer of an RHM material bonded to a base layer of a graphitic material, said RHM material comprising a hot pressed mixture of titanium diboride and aluminum nitride powders, said composite tile being further characterized by the bond between said layer of an RHM material and said base layer of a graphitic material, said bond having been produced simultaneously as said layer of an RHM material is formed by hot pressing said mixture of said powders directly against said base layer of a graphitic material, said base layer of a graphitic material being bonded to said carbonaceous block by means of a carbonaceous cement, said layer of an RHM material thereby providing a molten aluminum contacting surface of said cathode.

7. The construction block of claim 6 wherein said carbonaceous block includes a recess and said composite tile is set within said recess and bonded to said carbonaceous block by means of a graphitic cement with the interface between said layer of an RHM material and said base layer of a graphitic material being disposed within said recess and below the adjacent exterior surface of said carbonaceous block.

8. The construction block of claim 6 wherein said carbonaceous block is made of graphite.

9. The construction block of claim 6 wherein said layer of an RHM material is reinforced with fibers or particles.

10. The construction block of claim 9 wherein said fibers or particles are formed of a material selected from the group consisting of carbon, graphite and silicon carbide.

11. An alumina reduction cell having a drained cathode which comprises a carbonaceous bed and a composite tile, said composite tile being characterized by a layer of an RHM material bonded to a base layer of a graphitic material, said RHM material comprising a hot pressed mixture of titanium diboride and aluminum nitride powders, said composite tile being further characterized by the bond between said layer of an RHM material and said base layer of a graphitic material, said bond having been produced simultaneously as said layer of an RHM material is formed by hot pressing said mixture of said powders directly against said base layer of a graphitic material, said base layer of a graphitic material being bonded to said carbonaceous bed by means of a carbonaceous cement, said layer of an RHM material thereby providing a molten aluminum contacting surface of said cathode.

12. The alumina reduction cell of claim 11 wherein said carbonaceous bed includes a recess and said composite tile is set within said recess and bonded to said carbonaceous bed by means of a graphitic cement with the interface between said layer of an RHM material and said base layer of a graphitic material being disposed within said recess and below the adjacent exterior surface of said carbonaceous bed.

13. The alumina reduction cell of claim 12 wherein said carbonaceous bed is constructed from graphite blocks joined together with a graphitic cement.

14. The alumina reduction cell of claims 11, 12 or 13 wherein said molten aluminum contacting surface provided by said layer of an RHM material is inclined from the horizontal to facilitate the drainage of molten aluminum from said layer of an RHM material.

15. The alumina reduction cell of claims 11, 12 or 13 wherein said drained cathode is provided with one or more channels to facilitate the drainage of molten aluminum from said layer of an RHM material.

16. The alumina reduction cell of claims 11, 12 or 13 which further comprises interior sidewalls made of a graphitic material, said interior sidewalls being adapted to contact and contain the electrolytic bath necessary for the operation of said alumina reduction cell.

17. The alumina reduction cell of claim 16 wherein said interior sidewalls are constructed from graphite blocks joined together with a graphitic cement.

18. The alumina reduction cell of claims 11, 12 or 13 wherein said layer of an RHM material is reinforced with fibers or particles.

19. The alumina reduction cell of claim 18 wherein said fibers or particles are formed of a material selected from the group consisting of carbon, graphite and silicon carbide.

20. A composite tile, said composite tile being characterized by a layer of an RHM material bonded to a base layer of a graphitic material, said RHM material comprising a hot pressed mixture of titanium diboride and aluminum nitride powders, said composite tile being further characterized by the bond between said layer of an RHM material and said base layer of a graphitic material, said bond having been produced simultaneously as said layer of an RHM material is formed by hot pressing said mixture of said powders directly against said base layer of a graphitic material.

21. The composite tile of claim 20 wherein the volumetric proportion of tianium diboride to aluminum nitride in said mixture of said powders is in the range of about 2:3 to about 3:2.

22. The composite tile of claim 21 wherein the volumetric proportion of titanium diboride to aluminum nitride in said mixture of said powders is about 1:1.

23. The composite tile of claims 20, 21 or 22 wherein said mixture of said powders has been hot pressed to at least about 85 percent of its theoretical density.

24. The composite tile of claim 22 wherein said mixture of said powders has been hot pressed to a density of at least about 3.7 gm/cc.

25. The composite tile of claims 20, 21 or 22 wherein said graphitic material is a graphite characterized by coefficients of thermal expansion within the range of about $5\times10^{-6}/°C$ to about $8.5\times10^{-6}/°C$ in all directions parallel to the plane of said composite tile and by a specific room temperature resistivity of less than about $1.0\times10^{-2}$ ohm-cm in the direction normal to the plane of said composite tile.

26. The composite tile of claim 22 wherein said RHM material is characterized by coefficients of thermal expansion within the range of about $5\times10^{-6}$ to about $7\times10^{-6}/°C$ in all directions parallel to the plane of said composite tile and said graphitic material is a graphite characterized by coefficients of thermal expansion within the range of about $7\times10^{-6}$ to about $8.5\times10^{-6}/°C$ in all directions parallel to the plane of said composite tile and by a specific room temperature resistivity of less than about $4\times10^{-3}$ ohm-cm in the direction normal to the plane of said composite tile.

27. The composite tile of claims 20, 21 or 22 wherein said layer of an RHM material is within the range of about 0.250 to about 0.375 (0.508 to 0.953 centimeters) inch thick and said base layer of a graphitic material is within the range of about 0.750 to 1.00 inch (1.928 to 2.540 centimeters) thick.

28. The composite tile of claims 20, 21 or 22 wherein said layer of an RHM material is reinforced with fibers or particles.

29. The composite tile of claim 28 wherein said fibers or particles are formed of a material selected from the group consisting of carbon, graphite and silicon carbide.

* * * * *